(12) United States Patent
Shin et al.

(10) Patent No.: US 9,122,842 B2
(45) Date of Patent: Sep. 1, 2015

(54) APPARATUS AND METHOD FOR ENHANCING SECURITY IN HETEROGENEOUS COMPUTING ENVIRONMENT

(71) Applicant: Samsung Electronics Co., Ltd., Suwon-si (KR)

(72) Inventors: Yong Sam Shin, Hwaseong-si (KR); Min Young Son, Yongin-si (KR); Seung Won Lee, Hwaseong-si (KR); Shi Hwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/665,504

(22) Filed: Oct. 31, 2012

(65) Prior Publication Data

US 2013/0117808 A1    May 9, 2013

(30) Foreign Application Priority Data

Nov. 9, 2011    (KR) .................. 10-2011-0116446

(51) Int. Cl.
   *G06F 21/50*    (2013.01)
   *G06F 21/00*    (2013.01)

(52) U.S. Cl.
   CPC ............... *G06F 21/00* (2013.01); *G06F 21/50* (2013.01)

(58) Field of Classification Search
   None
   See application file for complete search history.

(56) References Cited

U.S. PATENT DOCUMENTS

| | | | |
|---|---|---|---|
| 5,634,058 A * | 5/1997 | Allen et al. .................. | 717/163 |
| 7,587,724 B2 * | 9/2009 | Yeap ............................ | 719/328 |
| 7,904,278 B2 * | 3/2011 | Wilson et al. ................ | 702/186 |
| 8,166,285 B2 * | 4/2012 | Lee .................................. | 713/1 |
| 8,326,579 B2 * | 12/2012 | Wilson et al. ................ | 702/186 |
| 8,380,666 B2 * | 2/2013 | Ejiri ............................. | 707/621 |
| 8,452,740 B2 * | 5/2013 | Seo et al. ...................... | 707/694 |
| 8,528,083 B2 * | 9/2013 | Lewis ............................ | 726/22 |
| 2003/0226014 A1 | 12/2003 | Schmidt et al. | |
| 2004/0003137 A1 | 1/2004 | Callender et al. | |
| 2004/0060046 A1 * | 3/2004 | Good et al. .................... | 717/174 |
| 2007/0234330 A1 * | 10/2007 | Field ............................. | 717/165 |
| 2007/0261120 A1 * | 11/2007 | Arbaugh et al. ............... | 726/26 |
| 2008/0016339 A1 * | 1/2008 | Shukla ......................... | 713/164 |
| 2008/0127142 A1 | 5/2008 | Wrighton et al. | |
| 2008/0127292 A1 * | 5/2008 | Cooper et al. ..................... | 726/1 |
| 2010/0031360 A1 * | 2/2010 | Seshadri et al. ............... | 726/24 |

(Continued)

FOREIGN PATENT DOCUMENTS

| | | |
|---|---|---|
| KR | 1020020016701 | 3/2002 |
| KR | 1020020060075 | 7/2002 |

(Continued)

*Primary Examiner* — Christopher Revak
(74) *Attorney, Agent, or Firm* — NSIP Law

(57) ABSTRACT

An apparatus and method for enhancing security and stability in a heterogeneous computing environment that supports an open standard parallel program are provided. A method of enhancing security in a heterogeneous computing environment may include loading a source code kernel corresponding to an application program to be installed in a host system, determining whether the source code kernel is targeted for integrity check, based on a security policy of the host system, prior to cross-compiling the source code kernel, requesting a security engine of a computing device to check an integrity of the source code kernel, when the source code kernel is determined to be targeted for the integrity check, and controlling an operation of a runtime compiler based on a check result received from the security engine.

22 Claims, 10 Drawing Sheets

(56) References Cited

U.S. PATENT DOCUMENTS

| | | | |
|---|---|---|---|
| 2010/0031361 A1* | 2/2010 | Shukla | 726/24 |
| 2012/0011503 A1* | 1/2012 | Filali-Adib et al. | 718/1 |
| 2012/0054475 A1* | 3/2012 | Lee | 713/1 |
| 2013/0139264 A1* | 5/2013 | Brinkley et al. | 726/24 |
| 2013/0227263 A1* | 8/2013 | Kim et al. | 713/2 |
| 2013/0227264 A1* | 8/2013 | Kim et al. | 713/2 |
| 2013/0227694 A1* | 8/2013 | Weinstein et al. | 726/25 |

FOREIGN PATENT DOCUMENTS

| | | |
|---|---|---|
| KR | 1020050077664 | 8/2005 |
| KR | 1020080057917 | 6/2008 |

\* cited by examiner

APPARATUS AND METHOD FOR ENHANCING SECURITY IN HETEROGENEOUS COMPUTING ENVIRONMENT

CROSS-REFERENCE TO RELATED APPLICATIONS

This application claims the priority benefit of Korean Patent Application No. 10-2011-0116446, filed on Nov. 9, 2011, in the Korean Intellectual Property Office, the disclosure of which is incorporated herein by reference.

BACKGROUND

1. Field

One or more embodiments of the following description relate to an apparatus and method for enhancing security and stability in a heterogeneous computing environment that supports an open standard parallel program.

2. Description of the Related Art

Due to the spread of personal mobile terminals and an increase in information processing demands, components of computing devices are becoming increasingly complex, and in demand to simultaneously process various applications. Additionally, based on an increase in a number of applications used to process multimedia requiring real-time processing, requirements for system performance of computing devices are gradually increased, and it is difficult to efficiently process applications by only a single processor.

To overcome such situations, a computing technology employing parallel programming appears in a multi-core system. Recently, parallel programming is being used in a heterogeneous computing environment that controls a Graphics Processing Unit (GPU) as well as a multi-core Central Processing Unit (CPU), and accordingly there is a demand for a heterogeneous computing technology based on an open standard and a demand for enhancing security in the heterogeneous computing environment.

SUMMARY

The foregoing and/or other aspects are achieved by providing a method of enhancing security in a heterogeneous computing environment, the method including loading a source code kernel, the source code kernel corresponding to an application program to be installed in a host system, determining whether the source code kernel is targeted for integrity check, based on a security policy of the host system, prior to cross-compiling the source code kernel, requesting a security engine of a computing device to check an integrity of the source code kernel, when the source code kernel is determined to be targeted for the integrity check, and controlling an operation of a runtime compiler based on a check result received from the security engine.

The method may further include determining the security policy based on a location in which the source code kernel is stored.

The method may further include generating an integrity check list, when the source code kernel is determined to be targeted for the integrity check, the integrity check list showing that the source code kernel is targeted for the integrity check, and storing the integrity check list in an integrity list database (DB).

The method may further include updating the integrity check list with a change in a target for integrity check in the integrity list DB, by interoperating with an Operating System (OS) of the host system, when the change in the target occurs.

The method may further include receiving the check result from the security engine, and storing a security level of the source code kernel in an integrity list DB, based on the received check result.

The method may further include cross-compiling the source code kernel and generating a binary kernel, when the integrity of the source code kernel is successfully checked.

The foregoing and/or other aspects are also achieved by providing a method of enhancing security in a heterogeneous computing environment, the method including receiving a request to check an integrity of a source code kernel, from a security agent of a host system, checking the integrity of the source code kernel, in a security engine of a computing device, and transferring a result of the checking to the host system.

The method may further include storing, in an Integrity Check Value Database (ICV DB), a fingerprint value generated by checking the integrity of the source code kernel.

The ICV DB may be located in an independent memory region in the computing device.

The checking may include checking the integrity of the source code kernel by comparing a fingerprint value generated by checking the integrity of the source code kernel with an original fingerprint value stored in an ICV DB.

The method may further include transferring, to a device runtime, a message to request the source code kernel to be executed, when the checking succeeds, and transferring, to the device runtime, a message to request the source code kernel to be unexecuted, when the checking fails.

The method may further include generating an original fingerprint value by checking an integrity of a source code kernel, the source code kernel not being exposed to a malicious code, and storing the original fingerprint value in an ICV DB.

The method may further include acquiring, from the security agent, information regarding a change in a target for integrity check, checking an integrity of a source code kernel of the target, when the target is changed, and updating an ICV DB with a fingerprint value generated by checking the integrity of the source code kernel.

The security engine may be located in the computing device in a form of built in kernel.

The foregoing and/or other aspects are achieved by providing an apparatus to enhance security in a heterogeneous computing environment, the apparatus including a loading unit to load a source code kernel, the source code kernel corresponding to an application program to be installed in a host system, a determining unit to determine whether the source code kernel is targeted for integrity check, based on a security policy of the host system, prior to cross-compiling the source code kernel, a communication unit to request a security engine of a computing device to check an integrity of the source code kernel, when the source code kernel is determined to be targeted for the integrity check, and a controller to control an operation of a runtime compiler based on a check result received from the security engine.

The apparatus may further include a list generating unit to generate an integrity check list, when the source code kernel is determined to be targeted for the integrity check, the integrity check list showing that the source code kernel is targeted for the integrity check, and a memory unit to store the integrity check list in an integrity list DB.

The apparatus may further include an updating unit to update the integrity check list with a change in a target for integrity check in the integrity list DB, by interoperating with an OS of the host system, when the change in the target occurs.

The foregoing and/or other aspects are also achieved by providing an apparatus to enhance security in a heterogeneous computing environment, the apparatus including a communication unit to receive a request to check an integrity of a source code kernel, from a security agent of a host system, an integrity check unit to check the integrity of the source code kernel in a security engine of a computing device, and a controller to control the security engine to transfer a result of the checking of the integrity to the host system.

The apparatus may further include a memory unit to store, in an ICV DB, a fingerprint value generated by checking the integrity of the source code kernel.

The integrity check unit may check the integrity of the source code kernel by comparing a fingerprint value generated by checking the integrity of the source code kernel with an original fingerprint value stored in an ICV DB.

According to another aspect of one or more embodiments, there is provided at least one non-transitory computer readable medium storing computer readable instructions to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of one or more embodiments, taken in conjunction with the accompanying drawings of which.

DETAILED DESCRIPTION

Figure 1:
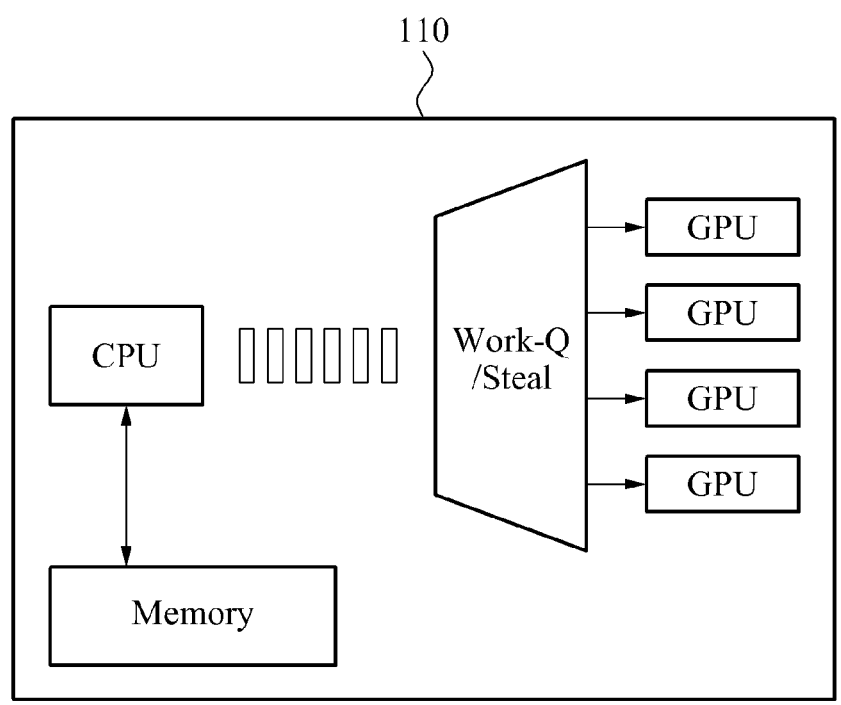
FIG. 1 illustrates a diagram of a heterogeneous computing environment according to embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a diagram of a heterogeneous computing environment 110 according to embodiments.

The heterogeneous computing environment 110 refers to an environment in which a host processor and a computing device are interconnected via a bus. The host processor may transfer, via the bus, a kernel to be performed in the computing device. The kernel may refer to a task required to be performed by the computing device.

Referring to FIG. 1, in the heterogeneous computing environment 110, a Central Processing Unit (CPU) may function as a host processor, and a Graphics Processing Unit (GPU) may function as a computing device. The CPU may call a source code kernel stored in a memory, may cross-compile the source code kernel, and may generate a binary kernel. In embodiments, the source code kernel may refer to a kernel in the form of a source code, and the binary kernel may refer to a kernel in a binary form. The GPU may perform the binary kernel, and may execute an application program. Additionally, a work-queue(Q)-steal scheme may refer to a typical scheme to solve imbalance between threads caused by using a queue for threads.

An open standard program model may provide a heterogeneous cross-platform technology, such as a CPU-GPU. A developer may relatively easily develop a parallel program using an abstract Application Programming Interface (API) provided in an open standard platform. The open standard program model may include, for example, an Open Computing Language (OpenCL), an Open Graphics Library (OpenGL), a Web Computing Language (WebCL), a Web Graphics Library (WebGL), and the like. New technologies are continuously developed and proposed, and accordingly standardization is being performed.

To minimize dependence of a developed source code kernel on hardware, a just-in-time (JIT) compilation scheme may be used in most standards. A source code kernel to be performed may be developed in advance, and may be stored in the form of a file in a memory. However, the source code kernel stored in the memory may be vulnerable to security, compared with an application program executed in a host processor. Additionally, when the source code kernel, such as a WebGL, is downloaded from an open network such as the Internet, and the downloaded source code is executed, the security of the source code kernel may be exposed to a more vulnerable state.

A security enhancement apparatus according to embodiments may be applied to the heterogeneous computing environment 110 of FIG. 1. However, an environment to which the security enhancement apparatus is applicable is not limited to the heterogeneous computing environment 110 of FIG. 1.

Figure 2:
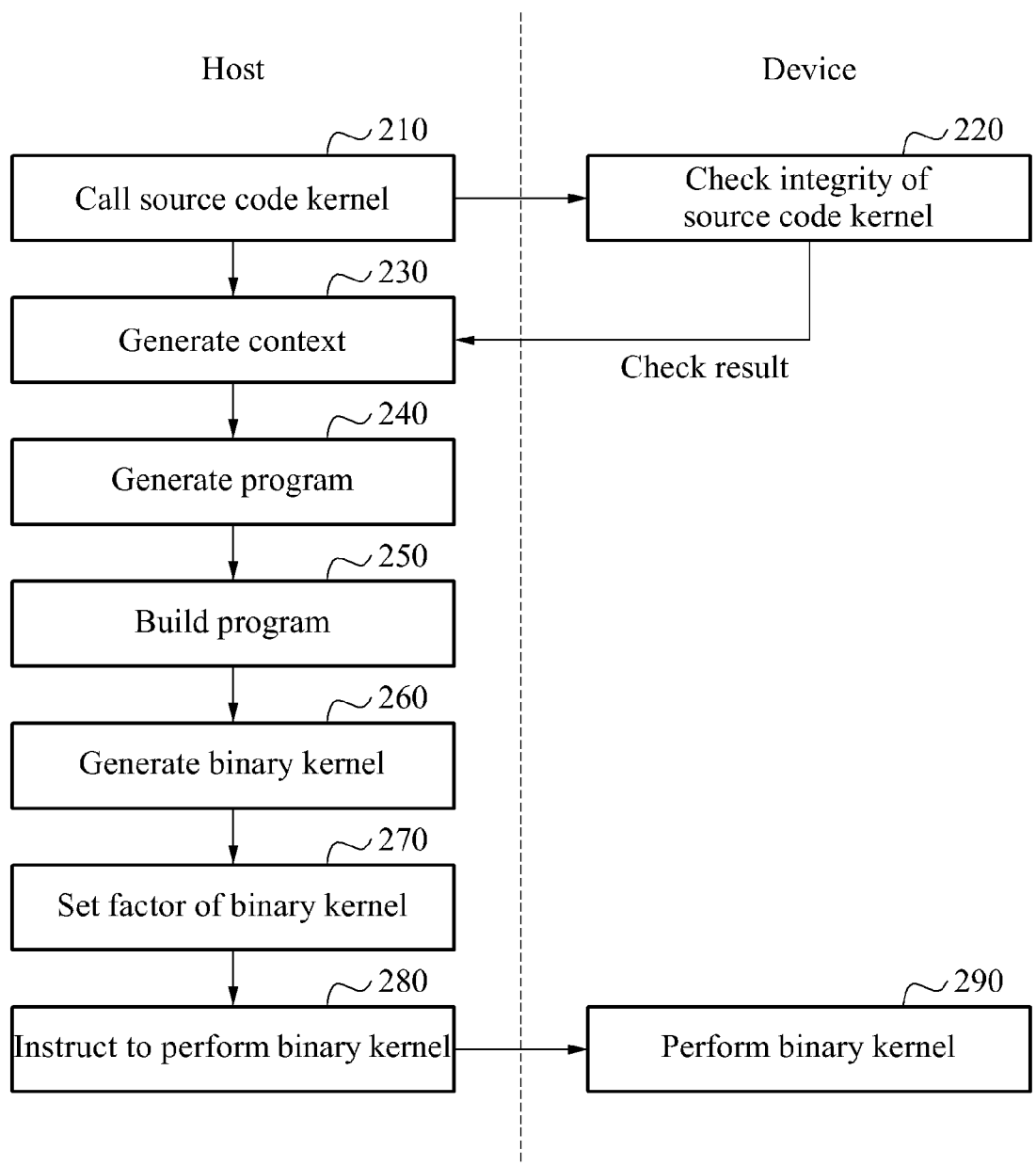
FIG. 2 illustrates a flowchart of a program model in which security is enhanced by a security enhancement apparatus according to embodiments.

FIG. 2 illustrates a flowchart of a program model in which security is enhanced by a security enhancement apparatus according to embodiments.

Referring to FIG. 2, in operation 210, a host processor may call, from a memory, a source code kernel corresponding to an application program. The source code kernel may be typically stored in the form of a file in a memory (for example, a file such as 'Kernel_code.c').

In operation 220, a computing device may check an integrity of the source code kernel. Such integrity check may refer to determining whether the source code kernel bears traces of being hacked or modified by a malicious code. Accordingly, it is possible to guarantee that only an object permitted through integrity check may access and modify information.

The computing device may check an integrity of only a target requested by the host processor.

When a check result indicating that the integrity of the source code kernel is successfully checked, is received from the computing device, the host processor may generate a context of the source code kernel in operation 230.

In operation 240, the host processor may generate a program using the context as an input value.

In operation 250, the host processor may build the program by inputting, to a compiler, the source code kernel in the form of a string or text.

In operation 260, the host processor may perform cross-compiling, and may generate a binary kernel.

In operation 270, the host processor may set a factor of the generated binary kernel.

In operation 280, the host processor may instruct the computing device to perform the generated binary kernel.

In operation 290, the computing device may perform the binary kernel, in response to an instruction from the host processor.

Since the computing device checks the integrity of the source code kernel prior to performing the source code kernel, the host processor may not need to perform a source code kernel hacked or modified by a malicious code. Thus, it is possible to enhance security of a system of a heterogeneous computing environment by checking the integrity of the source code kernel.

Depending on situations, the host processor may not perform a next operation, since an integrity check request may be delayed by a program that is being already executed. In this instance, when the integrity check is normally determined, an unnecessary delay may be added in terms of performance. To prevent a reduction in performance due to a delay in the check result, the host processor may generally perform operations 240 through 290 and may enable the check result to be verified for each of operations 240 through 290, rather than generating the context in operation 230 after receiving the check result based on setting of options.

Figure 3:
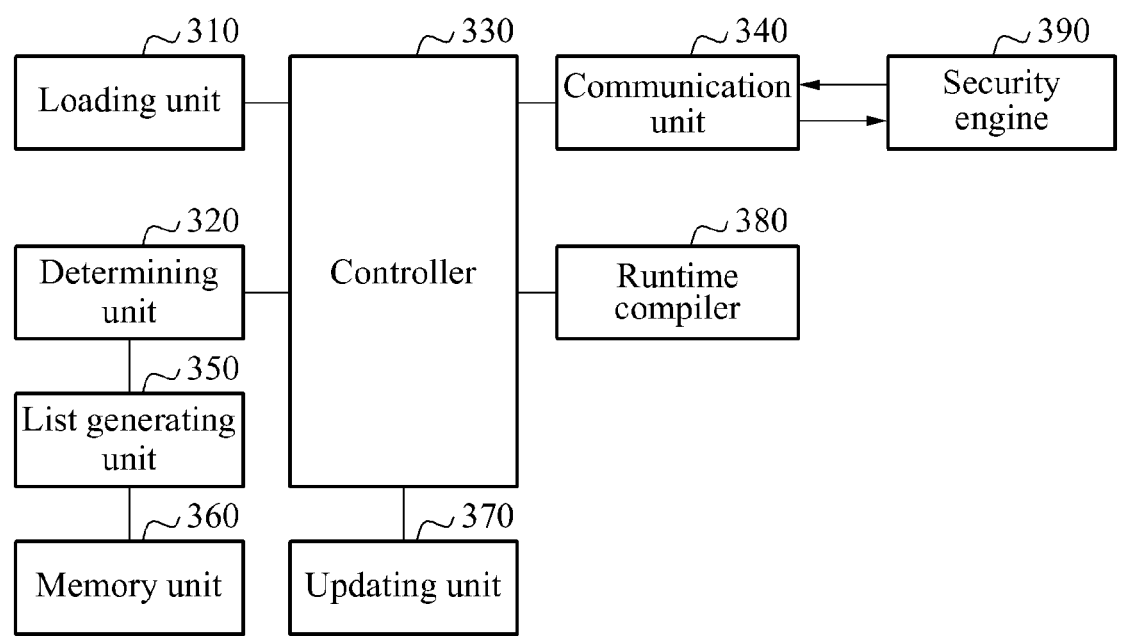
FIG. 3 illustrates a block diagram of an apparatus to enhance security in a heterogeneous computing environment according to embodiments.

FIG. 3 illustrates a block diagram of an apparatus to enhance security in a heterogeneous computing environment according to embodiments.

The apparatus of FIG. 3 may include a loading unit 310, a determining unit 320, a controller 330, and a communication unit 340.

The loading unit 310 may load a source code kernel from a memory. The source code kernel may correspond to an application program that is to be installed in a host system. For example, when an application program is installed or executed in the host system, the loading unit 310 may load, from the memory, a source code kernel corresponding to the application program.

The source code kernel may be developed in advance by a developer, and may be stored in the form of a file in the memory. The host system may refer to a host processor.

The determining unit 320 may determine whether the source code kernel is targeted for integrity check, based on a security policy of the host system, prior to cross-compiling the source code kernel. The security policy of the host system may be determined in advance by a user.

Additionally, the security policy of the host system may be determined so that the integrity check is performed on all source code kernels periodically or in real-time. For example, when the integrity check is performed in real-time, a high-level security policy may be defined. When the integrity check is periodically performed, a low-level security policy may be defined.

The security policy of the host system may enable the integrity check to be performed only when a change in the source code kernel occurs, after an integrity of the source code kernel is already checked. The change in the source code kernel may refer to adding, deleting, or changing a part of the source code kernel.

When the source code kernel is determined to be targeted for the integrity check, the communication unit 340 may request a security engine 390 of a computing device to check the integrity of the source code kernel. The security engine 390 may be located in the computing device that is advantageous to computing acceleration. Additionally, the security engine 390 may be located in the computing device in a form of built in kernel, and may authenticate an encrypted string of the source code kernel. In other words, the security engine 390 may be generated in advance during developing of the computing device, and may be located in a region of the computing device. To authenticate the encrypted string, a public key scheme used to authenticate a string, or an authentication scheme for a signature of a string such as a hash and the like may be used. In addition, typical various authentication schemes may be used.

The security engine 390 of the computing device may authenticate the encrypted string more quickly than authentication performed in the host system.

As described above, an integrity of a source code kernel targeted for integrity check may be checked prior to cross-compiling the source code kernel and accordingly, it is possible to enhance security against a malicious code or hacking. Additionally, when a source code kernel is determined not to be targeted for the integrity check, security of the source code kernel may be determined to be guaranteed already and accordingly, there is no need to again request the integrity check.

The controller 330 may control an operation of a runtime complier 380 based on a check result received from the security engine 390. The check result may indicate a result of the integrity check. For example, when an integrity of a source code kernel is guaranteed based on the check result, the controller 330 may enable the runtime complier 380 to be operated. The runtime complier 380 may generate a binary kernel by cross-compiling the source code kernel.

The apparatus of FIG. 3 may further include a list generating unit 350, a memory unit 360, and an updating unit 370.

The list generating unit 350 may generate an integrity check list showing that the source code kernel is targeted for the integrity check, when the source code kernel is determined to be targeted for the integrity check.

The apparatus of FIG. 3 may manage the integrity check list, and may secure information associated with targets for integrity check. For example, when a target for integrity check is deleted or added, the integrity check list may be updated.

The information associated with the targets may include information regarding a current security state of each of the targets, and information regarding whether a change in each of the targets occurs. The information regarding the current security state may include information regarding whether the integrity check is performed, and a result of the integrity check when the integrity check is performed. Additionally, the information regarding whether the change in each of the targets occurs may include information regarding whether each of the targets is deleted, added, or changed.

The memory unit 360 may store the integrity check list in an integrity list database (DB).

When a change in a target for integrity check occurs, the updating unit 370 may update the integrity check list with the change in the target in the integrity list DB, by interoperating with an Operating System (OS) of the host system. The OS of the host system may determine whether a change in a source code kernel corresponding to an application program occurs. For example, when a source code kernel is determined to differ from an existing source code kernel while the source code kernel is loaded from a memory, the OS may report, to the updating unit 370, occurrence of a change in a target for integrity check.

The list generating unit 350 may generate a new integrity check list with the change in the target. The updating unit 370 may update the integrity check list in the integrity list DB, based on the new integrity check list.

The controller 330 may control an overall operation of the apparatus of FIG. 3, and may perform functions of the loading unit 310, the determining unit 320, the communication unit 340, the list generating unit 350, the memory unit 360, and the updating unit 370. To individually describe the functions, the loading unit 310, the determining unit 320, the controller 330, the communication unit 340, the list generating unit 350, the memory unit 360, and the updating unit 370 are separately illustrated in FIG. 3. Accordingly, when the apparatus of FIG. 3 is actually implemented, the controller 330 may be configured to perform all of the functions.

Figure 4:
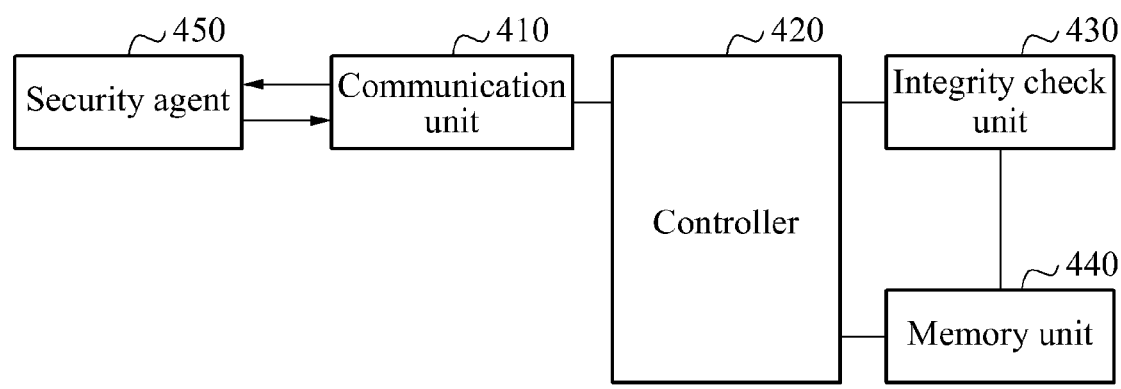
FIG. 4 illustrates a block diagram of an apparatus to enhance security in a heterogeneous computing environment according to another embodiment.

FIG. 4 illustrates a block diagram of an apparatus to enhance security in a heterogeneous computing environment according to another embodiment.

The apparatus of FIG. 4 may include a communication unit 410, a controller 420, an integrity check unit 430, and a memory unit 440.

The communication unit 410 may receive, from a security agent 450 of a host system, a signal to request integrity check of a source code kernel. The security agent 450 may determine whether the source code kernel is targeted for integrity check, and may transmit the signal when the source code kernel is determined to be targeted for integrity check.

The integrity check unit 430 may check an integrity of the source code kernel in a security engine. The integrity check unit 430 may check the integrity of the source code kernel using the Microsoft File Checksum Integrity Verifier (FCIV). The integrity check unit 430 may verify an encrypted hash value in a source code file, and may check the integrity of the source code kernel. The encrypted hash value may be generated using a hash function, for example, a Message-Digest algorithm 5 (MD5), and a Secure Hash Algorithm-1 (SHA-1).

The integrity check unit 430 may generate a fingerprint value using the security engine. The fingerprint value may include a variety of information regarding a source code kernel. When security of the source code kernel is guaranteed, the integrity check unit 430 may generate a fingerprint value for the source code kernel, and may define the fingerprint value as an original fingerprint value. The original fingerprint value may be stored in an Integrity Check Value Database (ICV DB).

The security engine may be located in the computing device that is advantageous to computing acceleration. The security engine may be located in the computing device in a form of built in kernel, and may authenticate an encrypted string of the source code kernel.

The integrity check unit 430 may compare the generated fingerprint value with the original fingerprint value stored in the ICV DB. For example, when the generated fingerprint value is at least partially identical to the original fingerprint value, authentication of the source code kernel may be determined to succeed. Conversely, when the generated fingerprint value is different from the original fingerprint value, the authentication of the source code kernel may be determined to fail.

The fingerprint value may include information regarding a checksum value of an MD5 of a fingerprint, a fingerprint generation time, an access right, and the like.

The controller 420 may control the security engine to transfer the check result to the host system. As a result of the integrity check, when the authentication of the source code kernel fails, the security engine may return an error signal to the host system. Conversely, when the authentication of the source code kernel succeeds, the security engine may return a compiling request signal to the host system.

The memory unit 440 may store, in the ICV DB, a fingerprint value generated by checking the integrity of the source code kernel. The ICV DB may be located in an independent memory region in the computing device. Since the ICV DB may be held in a secure memory region in the computing device, a fingerprint value and an integrity check result may be safely stored in the ICV DB, without being contaminated. The secure memory region may include, for example, a memory heap.

The communication unit 410 may acquire, from the security agent, information regarding a change in a target for the integrity check. For example, when the target for the integrity check is changed, the integrity check unit 430 may check an integrity of a source code kernel of the changed target. The controller 420 may update the ICV DB with a fingerprint value generated by checking the integrity of the source code kernel.

The controller 420 may control an overall operation of the apparatus of FIG. 4, and may perform functions of the communication unit 410, the integrity check unit 430, and the memory unit 440. To individually describe the functions, the communication unit 410, the controller 420, the integrity check unit 430, and the memory unit 440 are separately illustrated in FIG. 4. Accordingly, when the apparatus of FIG. 4 is actually implemented, the controller 420 may be configured to perform all of the functions.

Figure 5:
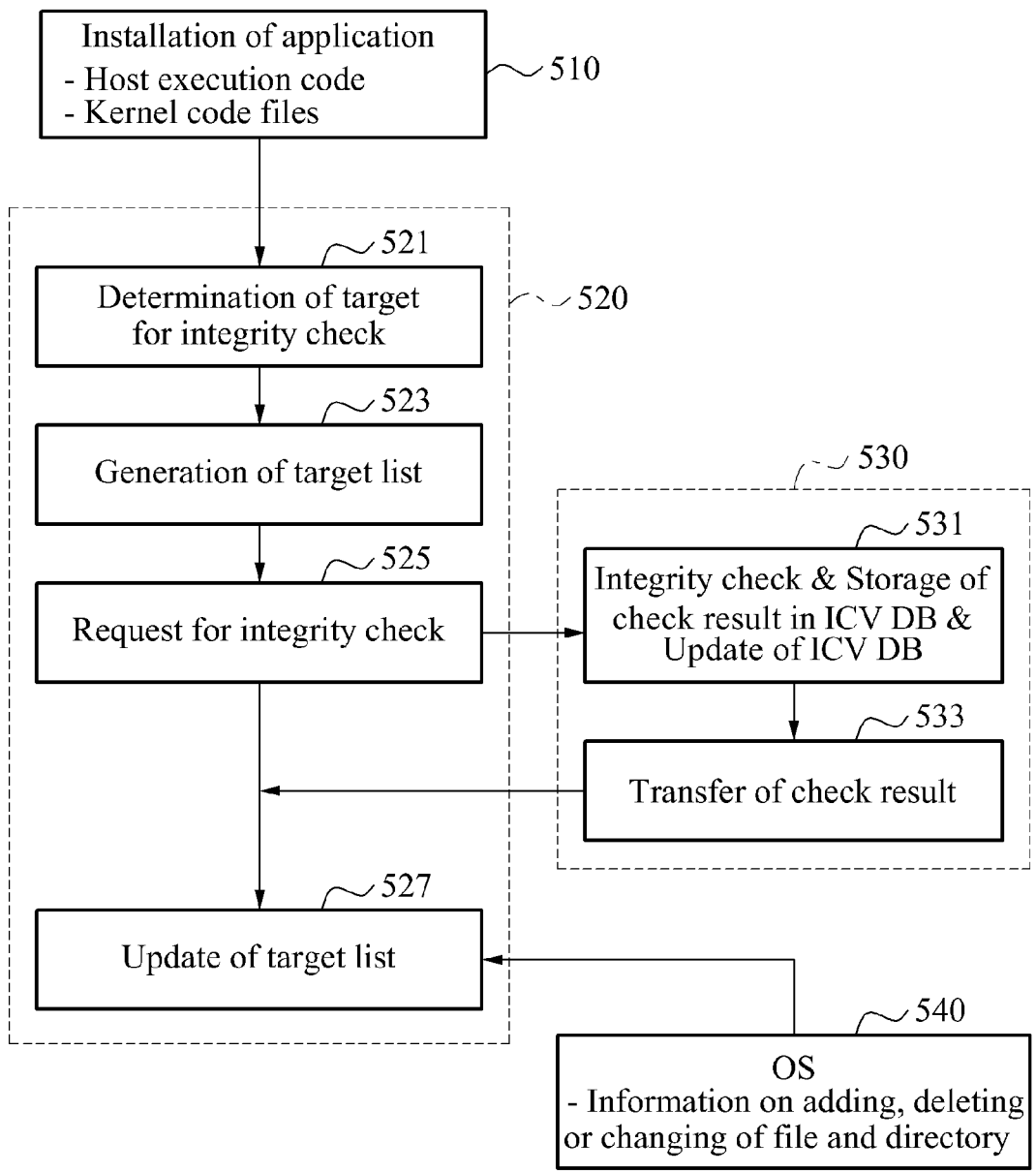
FIG. 5 illustrates a diagram of an apparatus to enhance security in a heterogeneous computing environment according to another embodiment.

FIG. 5 illustrates a diagram of an apparatus to enhance security in a heterogeneous computing environment according to another embodiment.

The apparatus of FIG. 5 may include a security agent 520, and a security engine 530.

The security agent 520 may receive an input of a host execution code, and may call kernel code files corresponding to an application from a memory, during installing of the application in operation 510. The kernel code files may refer to source code kernels.

The security agent 520 may determine whether the called kernel code files are targeted for integrity check in operation 521. A predetermined security policy may be used to determine whether the kernel code files are targeted for integrity check. When the kernel code files are determined to be targeted for integrity check in operation 521, the security agent 520 may generate a target list showing targets for the integrity check in operation 523.

The security agent 520 may request the security engine 530 to check integrity of the targets in the target list in operation 525. The security engine 530 may be located in a computing device. When a kernel code file and a directory in which the kernel code file is stored are changed, added, or deleted through an OS 540, the security agent 520 may acquire information regarding the changed, added, or deleted file and directory. The security agent 520 may update the target list based on a change, addition, or deletion of the targets as described above, in operation 527.

The security engine 530 may check the integrity of the targets, and may store, in an ICV DB, a check result obtained by checking the integrity in operation 531. When the target list is updated in operation 527, the security engine 530 may again check the integrity of the targets in the updated target list, and may update the ICV DB with a check result in operation 531.

The security engine 530 may transfer the check result to the security agent 520 in operation 533. The security agent 520 may control a runtime compiler based on the received check result. Prior to operating the runtime compiler, the security agent 520 may request the security engine 530 to check the integrity of the kernel code files.

Figure 6:
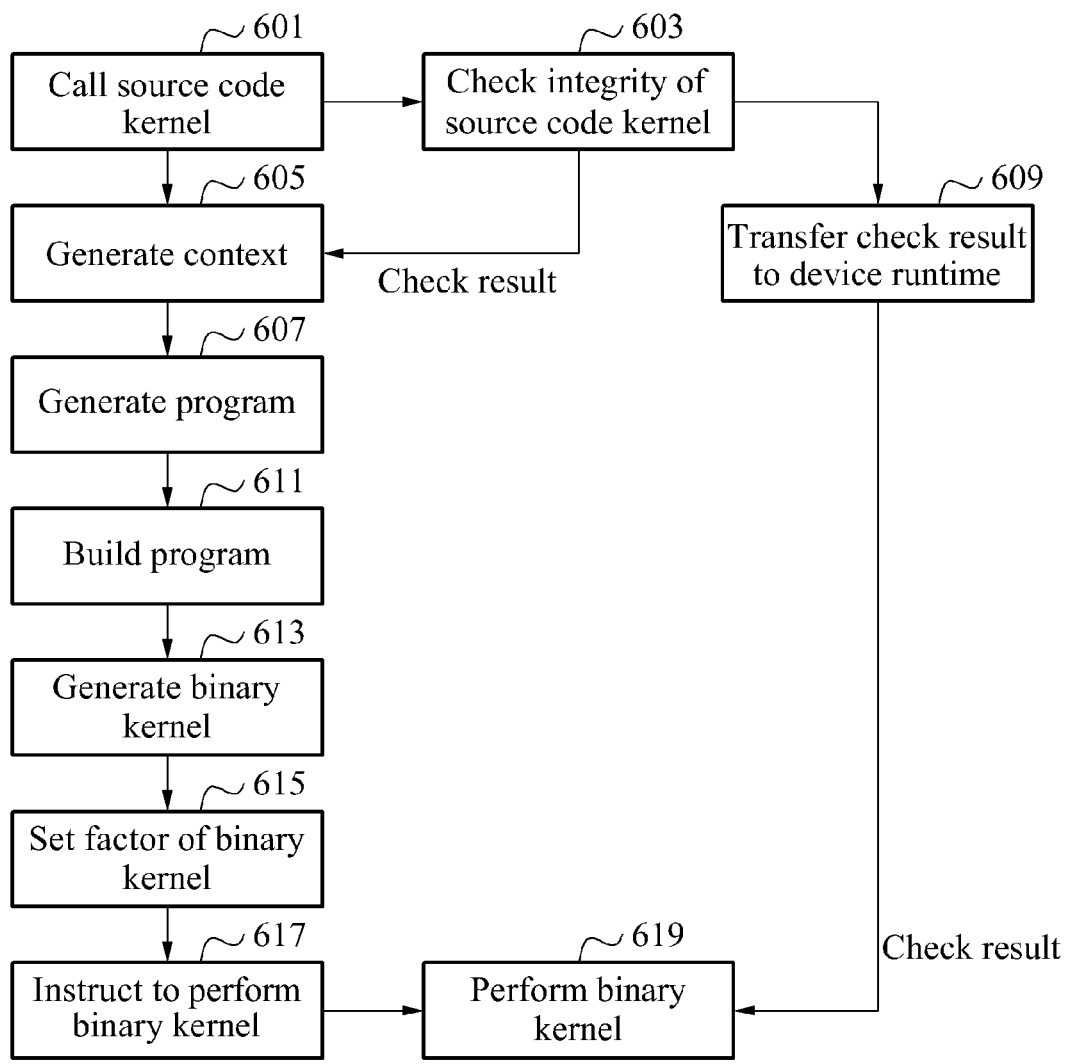
FIG. 6 illustrates a flowchart of operations of executing an application program in a security enhancement apparatus according to embodiments.

FIG. 6 illustrates a flowchart of operations of executing an application program in a security enhancement apparatus according to embodiments.

Referring to FIG. 6, in operation 601, a host processor may call, from a memory, a source code kernel corresponding to an application program. Source codes, for example, in an OpenCL, an OpenGL, a WebGL, and the like may be stored in the memory.

In operation 603, a computing device may check an integrity of the source code kernel. Such integrity check may refer to determining whether the source code kernel bears traces of being hacked or modified by a malicious code. The computing device may check an integrity of only a target requested by the host processor.

When a check result indicating that the integrity of the source code kernel is successfully checked is received from the computing device, the host processor may generate a context of the source code kernel in operation 605. When a check result error signal is received, the host processor may not generate the context. Additionally, as described above with reference to FIG. 2, the host processor may perform general operations independently, regardless of whether an integrity check result is received based on setting of options, and may verify the integrity check result in one of the operations performed by the host processor, and accordingly it is possible to prevent an overall performance of the application program from being reduced due to a delay in the check result.

In operation 607, the host processor may generate a program using the context as an input value.

In operation 609, the computing device may transfer a check result to a device runtime. The device runtime may perform a compiled source code kernel, only when authentication of the source code kernel succeeds based on the check result.

In operation 611, the host processor may build the program by inputting, to a compiler, the source code kernel in the form of a string or text.

In operation 613, the host processor may perform cross-compiling, and may generate a binary kernel.

In operation 615, the host processor may set a factor of the generated binary kernel. In operation 617, the host processor may instruct the computing device to perform the generated binary kernel.

In operation 619, the computing device may perform the binary kernel in response to an instruction from the host processor. For example, when a signal indicating a success of the integrity check is received, the device runtime of the computing device may perform the binary kernel. When an error signal or a request signal to prevent performing the binary kernel is received, the device runtime may not perform the binary kernel.

The device runtime may independently determine whether to perform the binary kernel, by receiving the check result.

Figure 7:
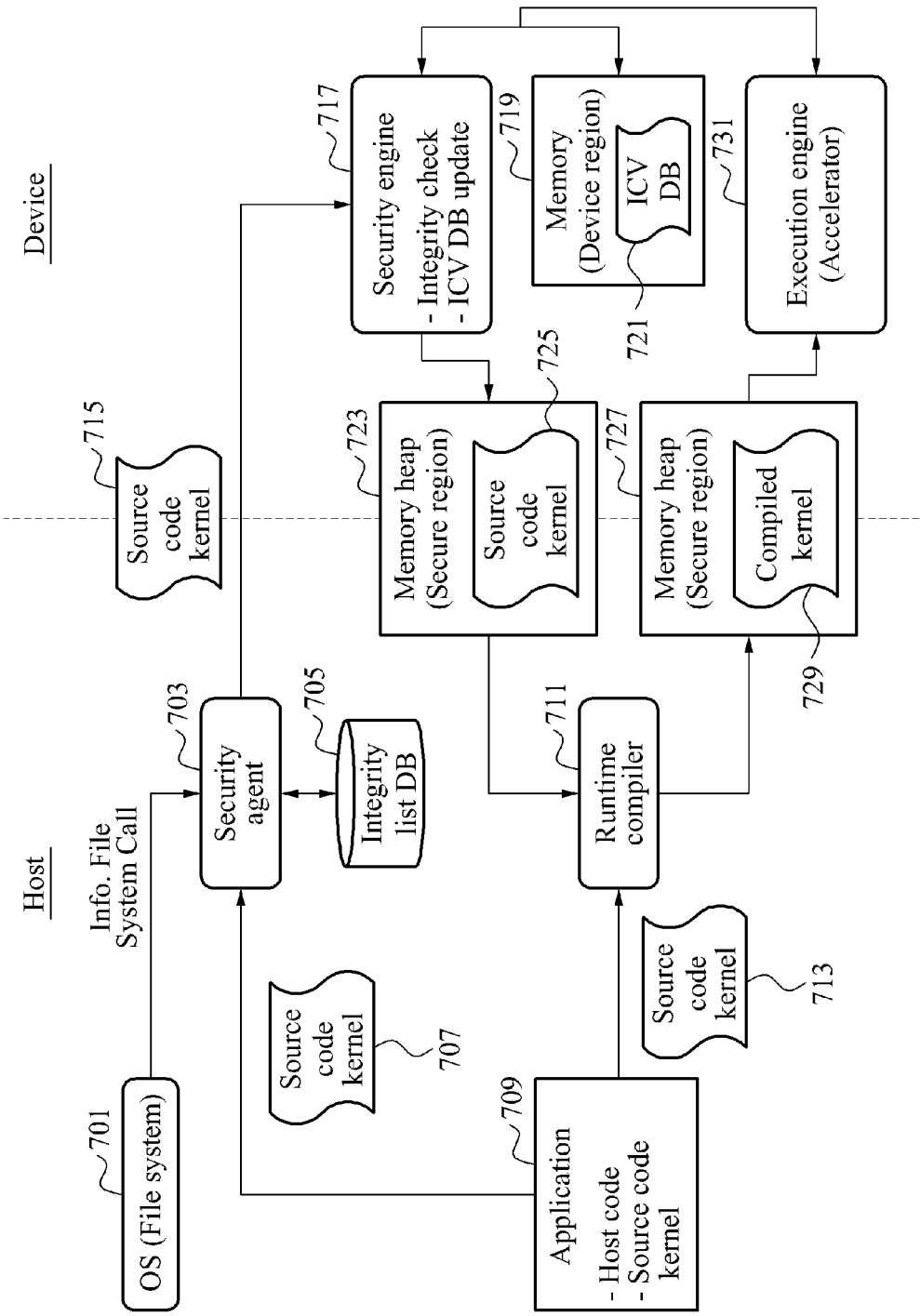
FIG. 7 illustrates a diagram illustrating of yet an apparatus to enhance security in a heterogeneous computing environment according to another embodiment.

FIG. 7 illustrates a diagram illustrating of yet an apparatus to enhance security in a heterogeneous computing environment according to another embodiment.

The apparatus of FIG. 7 may be divided into a host region and a device region. In the host region, when an application 709 is installed, information on a source code kernel 707 associated with the application 709 may be provided. The source code kernel 707 may refer to a kernel in the form of a source code, as described above.

The security agent 703 may load the source code kernel 707 from a memory, and may determine whether the source code kernel 707 is targeted for integrity check. When the source code kernel 707 is determined to be targeted for the integrity check, the security agent 703 may generate an integrity check list, and may store the generated integrity check list in an integrity list DB 705.

The security agent 703 may request a security engine 717 in the device region to check an integrity of a source code kernel 715, which is determined to be targeted for integrity check. The security engine 717 may check the integrity of the source code kernel 715 using a general integrity check scheme. An ICV DB 721 may be located in a memory 719. Results of the integrity check and fingerprint values may be stored in the ICV DB 721.

The security agent 703 may acquire information from an OS 701, and may determine whether a change in the source code kernel 707 occurs. When the change in the source code kernel 707 occurs, the security agent 703 may check the integrity of the source code kernel 707, may update the integrity check list, and may request the security engine 717 to perform the integrity check.

The security engine 717 may perform authentication of the source code kernel 715, by comparing a fingerprint value generated by checking the integrity of the source code kernel 715 with an original fingerprint value stored in the ICV DB 721. A source code kernel 725 succeeded in authentication may be stored in a memory heap 723, and may be transferred to a runtime compiler 711.

When a change in the source code kernel 715 occurs, the security engine 717 may again check the integrity of the source code kernel 715. The ICV DB 721 may be updated with a result of checking the integrity of the source code kernel 715.

When a signal indicating a success in the authentication is received, the runtime compiler 711 may cross-compile a source code kernel 713, to generate a compiled kernel 729. The compiled kernel 729 may be stored in a memory heap 727. An execution engine 731 may perform a source code kernel associated with the application 709, using the compiled kernel 729. The execution engine 731 may execute the compiled kernel 729, only when a signal indicating a success in the authentication is received from the security engine 717.

Figure 8:
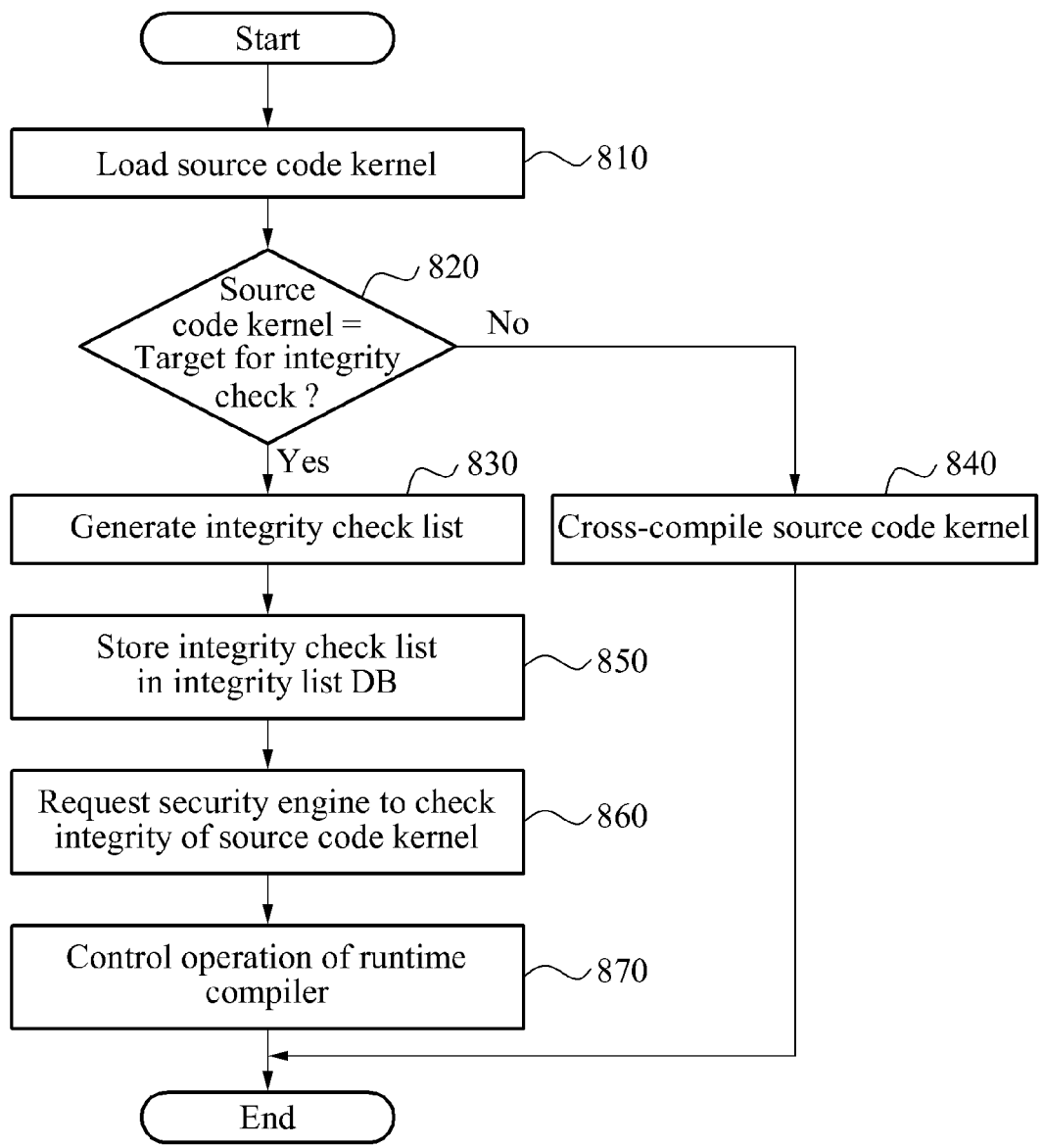
FIG. 8 illustrates a flowchart of a method of enhancing security in a heterogeneous computing environment according to embodiments.

FIG. 8 illustrates a flowchart of a method of enhancing security in a heterogeneous computing environment according to embodiments.

In operation 810, a security enhancement apparatus according to embodiments may load a source code kernel corresponding to an application program that is to be installed in a host system.

In operation 820, the security enhancement apparatus may determine whether the source code kernel is targeted for integrity check, based on a security policy of the host system, prior to cross-compiling the source code kernel. The security enhancement apparatus may determine the security policy based on a location in which the source code kernel is stored. For example, when the source code kernel is stored in a relatively secure place, a low-level security policy may be determined. Additionally, when the source code kernel is stored in an environment that is relatively vulnerable to security, for example the Internet, a high-level security policy may be determined.

The security enhancement apparatus may determine whether source code kernels are targeted for the integrity check, for each application program, and may simultaneously request the integrity check for a plurality of source code kernels by grouping various application programs.

Additionally, the security enhancement apparatus may determine to check integrity of source code kernels, regardless of the security policy. In this instance, when the integrity check is performed in parallel using a plurality of security engines, a disadvantage caused by a delay in performance may rarely occur.

When the source code kernel is determined to be targeted for the integrity check, the security enhancement apparatus may generate an integrity check list in operation 830. The integrity check list may show that the source code kernel is targeted for the integrity check.

When the source code kernel is determined not to be targeted for the integrity check, the security enhancement apparatus may generate a binary kernel by cross-compiling the source code kernel, and may enable the binary kernel to be executed in the computing device in operation 840.

In operation 850, the security enhancement apparatus may store the integrity check list in an integrity list DB.

When the source code kernel is determined to be targeted for the integrity check, the security enhancement apparatus may request a security engine of a computing device to check the integrity of the source code kernel in operation 860.

In operation 870, the security enhancement apparatus may control an operation of a runtime compiler, based on a check result received from the security engine. The security enhancement apparatus may receive, from the security engine, the check result for the source code kernel. The security enhancement apparatus may store a security level of the source code kernel in the integrity list DB, based on the check result. When authentication of the source code kernel succeeds based on the check result, the security enhancement apparatus may determine the security level of the source code kernel to be good, and may store the determined security level in the integrity list DB.

Figure 9:
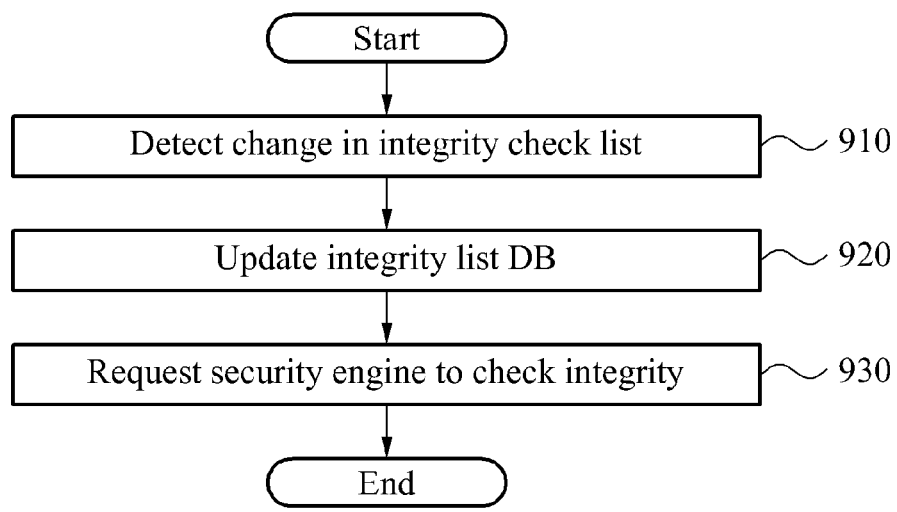
FIG. 9 illustrates a flowchart of another method of enhancing security in a heterogeneous computing environment according to embodiments.

FIG. 9 illustrates a flowchart of another method of enhancing security in a heterogeneous computing environment according to embodiments.

In operation 910, a security enhancement apparatus according to embodiments may detect a change in an integrity check list, by interoperating with an OS of a host system. Specifically, the security enhancement apparatus may acquire, from the OS, information regarding changing, adding, or deleting of a source code kernel. When the security enhancement apparatus generates a new integrity check list showing the source code kernel that are changed, added, or deleted, the change in the integrity check list may be determined to occur.

In operation 920, the security enhancement apparatus may update the integrity check list with the change in an integrity list DB. The integrity list DB may be updated to include latest information regarding targets requiring integrity check, namely, source code kernels.

In operation 930, the security enhancement apparatus may request a security engine to check integrity of the targets in the updated integrity check list. The security engine may be located in a computing device, and may be excellent in speed of integrity check, namely, in acceleration.

Figure 10:
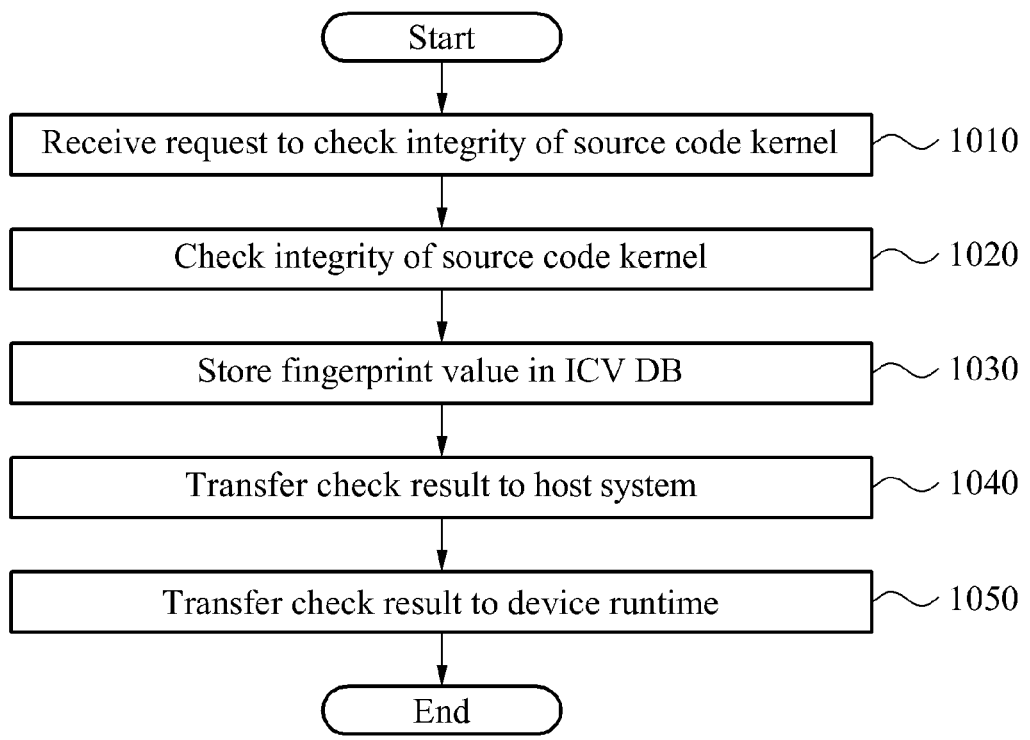
FIG. 10 illustrates a flowchart of still another method of enhancing security in a heterogeneous computing environment according to embodiments.

FIG. 10 illustrates a flowchart of still another method of enhancing security in a heterogeneous computing environment according to embodiments.

In operation 1010, a security enhancement apparatus according to embodiments may receive a request to check an integrity of a source code kernel, from a security agent of a host system. The source code kernel may be determined to be targeted for integrity check by the security agent.

In operation 1020, the security enhancement apparatus may check the integrity of the source code kernel in a security engine. The security enhancement apparatus may compare a fingerprint value generated by checking the integrity with an original fingerprint value stored in an ICV DB.

In operation 1030, the security enhancement apparatus may store, in the ICV DB, a fingerprint value generated by checking the integrity of the source code kernel. Specifically, the security enhancement apparatus may store, in the ICV DB, a fingerprint value passing through the integrity check.

In operation 1040, the security enhancement apparatus may transfer a check result to the host system. The check result may indicate whether the integrity check succeeds or fails. When the integrity check succeeds, the security agent may enable a runtime compiler to be operated. When the integrity check fails, the security agent may enable the runtime compiler not to be operated.

In operation 1050, the security enhancement apparatus may transfer the check result to a device runtime. When the integrity check succeeds, the security enhancement apparatus may transfer, to the device runtime, a message to request the source code kernel to be executed. When the integrity check fails, the security enhancement apparatus may transfer, to the device runtime, a message to request the source code kernel to be unexecuted.

Only when the message to request the source code kernel to be executed is received, the device runtime may execute the compiled kernel. Even when a source code kernel is cross-compiled in the runtime compiler prior to completing the integrity check for the source code kernel, and the compiled kernel stays in the device runtime.

According to embodiments, an apparatus to enhance security in a heterogeneous computing environment may check an integrity of a source code kernel at an initial stage in which the source code kernel is generated, and thus it is possible to enhance security of a kernel performed in a device, and to guarantee stability of an overall system.

Additionally, according to embodiments, an apparatus to enhance security in a heterogeneous computing environment may check an integrity of a source code kernel using a security engine, only when a change in the source code kernel occurs. Thus, it is possible to prevent a load of a system from occurring due to the integrity check.

Furthermore, according to embodiments, an apparatus to enhance security in a heterogeneous computing environment may more stably guarantee an integrity of a fingerprint value, by operating a separate ICV DB within a device.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD-ROM disks and DVDs; magnetooptical media such as optical disks; and hardware devices that are specially configured to store and perform program instructions, such are read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate ARRAY (FPGA), which executes program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice-versa.

Although embodiments have been shown and described, it would be appreciated by those skilled in the art that changes may be made in these embodiments without departing from the principles and spirit of the disclosure, the scope of which is defined in claims and their equivalents.

What is claimed is:

1. A method of enhancing security in a heterogeneous computing environment, the method comprising:
    loading a source code kernel, the source code kernel corresponding to an application program to be installed in a host system;
    determining whether the source code kernel is targeted for integrity check with respect to an ability to access and modify information of the computing environment, based on a security policy of the host system, prior to cross-compiling the source code kernel;
    requesting a security engine of a computing device to check an integrity of the source code kernel, when the source code kernel is determined to be targeted for the integrity check; and
    controlling an operation of a runtime compiler based on a check result received from the security engine.

2. The method of claim 1, further comprising:
    determining the security policy based on a location in which the source code kernel is stored.

3. The method of claim 1, further comprising:
    generating an integrity check list, when the source code kernel is determined to be targeted for the integrity check, the integrity check list showing that the source code kernel is targeted for the integrity check; and
    storing the integrity check list in an integrity list database (DB).

4. The method of claim 3, further comprising:
    updating the integrity check list with a change in a target for integrity check in the integrity list DB, by interoperating with an Operating System (OS) of the host system, when the change in the target occurs.

5. The method of claim 1, further comprising:
    receiving the check result from the security engine; and
    storing a security level of the source code kernel in an integrity list DB, based on the received check result.

6. The method of claim 1, further comprising:
    cross-compiling the source code kernel and generating a binary kernel, when the integrity of the source code kernel is successfully checked.

7. At least one non-transitory computer readable medium comprising computer readable instructions that control at least one processor to implement the method of claim 1.

8. A method, executed by a computing device, of enhancing security in a heterogeneous computing environment, the method comprising:
    receiving a request to check integrity of a source code kernel, from a security agent of a host system;
    determining the integrity of the source code kernel with respect to an ability to access and modify information of the computing environment, in a security engine of a computing device;
    transferring the integrity determination to the host system; and
    executing a binary kernel that is received from the host system as a result of transferring a determination of source code integrity to the host system, wherein the binary kernel is created by compiling the source code kernel.

9. The method of claim 8, further comprising: storing, in an Integrity Check Value Database (ICV DB), a fingerprint value generated by checking the integrity of the source code kernel.

10. The method of claim 9, wherein the ICV DB is located in an independent memory region in the computing device.

11. The method of claim 8, wherein the checking comprises checking the integrity of the source code kernel by comparing a fingerprint value generated by checking the integrity of the source code kernel with an original fingerprint value stored in an ICV DB.

12. The method of claim 8, further comprising:
    transferring, to a device runtime, a message to request the source code kernel to be executed, when the checking succeeds; and
    transferring, to the device runtime, a message to request the source code kernel to be unexecuted, when the checking fails.

13. The method of claim 8, further comprising:
    generating an original fingerprint value by checking an integrity of a source code kernel, the source code kernel not being exposed to a malicious code; and
    storing the original fingerprint value in an ICV DB.

14. The method of claim 8, further comprising:
    acquiring, from the security agent, information regarding a change in a target for integrity check;
    checking an integrity of a source code kernel of a changed target, when the target is changed; and
    updating an ICV DB with a fingerprint value generated by checking the integrity of the source code kernel.

15. The method of claim 8, wherein the security engine is located in the computing device in a form of built in kernel.

16. At least one non-transitory computer readable medium comprising computer readable instructions that control at least one processor to implement the method of claim 8.

17. An apparatus to enhance security in a heterogeneous computing environment, the apparatus comprising:
    a loading unit to load a source code kernel, the source code kernel corresponding to an application program to be installed in a host system;
    a determining unit to determine whether the source code kernel is targeted for integrity check with respect to an ability to access and modify information of the computing environment, based on a security policy of the host system, prior to cross-compiling the source code kernel;
    a communication unit to request a security engine of a computing device to check an integrity of the source code kernel, when the source code kernel is determined to be targeted for the integrity check; and
    a controller to control an operation of a runtime compiler based on a check result received from the security engine.

18. The apparatus of claim 17, further comprising:
a list generating unit to generate an integrity check list, when the source code kernel is determined to be targeted for the integrity check, the integrity check list showing that the source code kernel is targeted for the integrity check; and
a memory unit to store the integrity check list in an integrity list database (DB).

19. The apparatus of claim 18, further comprising:
an updating unit to update the integrity check list with a change in a target for integrity check in the integrity list DB, by interoperating with an Operating System (OS) of the host system, when the change in the target occurs.

20. An apparatus to enhance security in a heterogeneous computing environment, the apparatus comprising:
a communication unit to receive a request to check integrity of a source code kernel, from a security agent of a host system;
an integrity check unit to determine the integrity of the source code kernel with respect to an ability to access and modify information of the computing environment in a security engine of a computing device; and
a controller to control the security engine to transfer the integrity determination to the host system, wherein:
the controller executes a binary kernel that is received from the host system as a result of transferring a determination of source code integrity to the host system, wherein the binary kernel is created by compiling the source code kernel.

21. The apparatus of claim 20, further comprising: a memory unit to store, in an Integrity Check Value Database (ICV DB), a fingerprint value generated by checking the integrity of the source code kernel.

22. The apparatus of claim 20, wherein the integrity check unit checks the integrity of the source code kernel by comparing a fingerprint value generated by checking the integrity of the source code kernel with an original fingerprint value stored in an ICV DB.

* * * * *